United States Patent
Suzuki et al.

(10) Patent No.: US 10,530,045 B2
(45) Date of Patent: Jan. 7, 2020

(54) RADIO WAVE TRANSMISSIVE COVER

(71) Applicant: TOYODA GOSEI CO., LTD., Kiyosu-shi, Aichi-ken (JP)

(72) Inventors: Takahiro Suzuki, Kiyosu (JP); Hideto Maeda, Kiyosu (JP); Tatsuya Oba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/032,399

(22) Filed: Jul. 11, 2018

(65) Prior Publication Data
US 2019/0036205 A1    Jan. 31, 2019

(30) Foreign Application Priority Data
Jul. 26, 2017    (JP) .................. 2017-144878

(51) Int. Cl.
*H01Q 1/32* (2006.01)
*H01Q 1/38* (2006.01)
*G01S 13/93* (2006.01)

(52) U.S. Cl.
CPC ......... *H01Q 1/3233* (2013.01); *G01S 13/931* (2013.01); *H01Q 1/3283* (2013.01); *H01Q 1/38* (2013.01); *G01S 2013/9385* (2013.01)

(58) Field of Classification Search
CPC ...... H01Q 1/3233; H01Q 1/3283; H01Q 1/38; H01Q 1/42; H01Q 1/44; G01S 13/931; G01S 7/03; G01S 2007/027
See application file for complete search history.

(56) References Cited

U.S. PATENT DOCUMENTS

2008/0233367 A1* 9/2008 Maeda ................ B29C 45/1671
                                                                428/201
2016/0111776 A1* 4/2016 Okumura ............... H01Q 1/422
                                                                343/872

FOREIGN PATENT DOCUMENTS

JP    2008-230497 A    10/2008
JP    2009-088579 A    4/2009

* cited by examiner

*Primary Examiner* — Dameon E Levi
*Assistant Examiner* — David E Lotter
(74) *Attorney, Agent, or Firm* — Posz Law Group, PLC

(57) ABSTRACT

A radio wave transmissive cover includes a cover body having a transparent first cover layer, a colored second cover layer, and a base material layer. The second cover layer is formed on the back surface of the first cover layer. The base material layer is formed on the back surface of the second cover layer. An opening is provided between the outer circumference and the center of the cover body. The opening extends through at least the base material layer and the second cover layer in the thickness direction, and the opening is open on the back surface of the base material layer. The base material layer and the second cover layer are joined together through a recess-protrusion relationship, thereby forming a sealing portion around the opening. The sealing portion seals the gap between the base material layer and the second cover layer.

4 Claims, 4 Drawing Sheets

RADIO WAVE TRANSMISSIVE COVER

BACKGROUND OF THE INVENTION

The present invention relates to a radio wave transmissive cover arranged in a radio wave path of a radio wave radar device.

Millimeter wave radar devices (hereafter referred to as the radar device) have been installed in some vehicles in recent years such as automobiles in order to measure the distance or the relative speed between the vehicle and a nearby vehicle or obstacle. If the radar device in such a vehicle is arranged to be exposed, the radar device may adversely affect the design feature of the vehicle. In view of this, the radar device is arranged behind an emblem or a front grille located in the front of the vehicle, for example, and the emblem or the like is formed by a radio wave transmissive cover (hereafter referred to as the cover) through which radio waves pass (see Japanese Laid-Open Patent Publication No. 2008-230497).

The cover disclosed in the above publication includes a design layer, a cover layer for covering the front surface of the design layer, and a base material layer for covering the back surface of the design layer. The cover layer includes a first cover layer made of a first transparent plastic material and a second cover layer made of a mixed material containing the first transparent plastic material and colorant in which the second cover layer covers a part of the back surface of the first cover layer. The second cover layer includes a general part adjacent to the back surface of the first cover layer and a cover-side engaging part having an undercut shape in which the cover-side engaging part protrudes from the back surface of the general part on the entire circumference. The base material layer is made of a second plastic material having a melting point different from the melting point of the first transparent plastic material. The base material layer includes a base-material-side engaging part that is engaged with the cover-side engaging part.

With such a cover, the cover-side engaging part of the second cover layer and the base-material-side engaging part of the base material layer are engaged with each other, so that the second cover layer and the base material layer are mechanically fixed to each other. This provides firm integration of the second cover layer and the base material layer even in a case where the second cover layer and the base material layer are made of materials having melting points different from each other. As a result, the gap between the second cover layer and the base material layer is sealed, thereby preventing infiltration of water such as rainwater.

In such a cover, it is necessary to form the cover-side engaging part having the undercut shape and the base-material-side engaging part on the entire circumference in order to seal the gap between the second cover layer and the base material layer made of plastic materials having melting points different from each other. Due to this, if a camera for recording the front of the cover is to be arranged behind the cover, for example, it is necessary to form a recessed part that is recessed inwardly relative to the circumference on the outer circumference of the cover in order to make space for the camera lens. This may adversely affect the design feature of the cover.

SUMMARY OF THE INVENTION

It is an objective of the present invention to provide a radio wave transmissive cover that improves the flexibility in design while maintaining sealing properties.

To achieve the foregoing objective, in accordance with one aspect of the present invention, a radio wave transmissive cover is configured to be arranged in a radio wave path of a radio wave radar device. The radio wave transmissive cover includes a cover body, wherein the cover body has a transparent first cover layer made of a first plastic material; a colored second cover layer made of a material containing the first plastic material and colorant, the second cover layer being formed on the back surface of the first cover layer; and a base material layer made of a second plastic material different from the first plastic material, the base material layer being formed on the back surface of the second cover layer, an opening is provided between the outer circumference and the center of the cover body, the opening extends through at least the base material layer and the second cover layer in the thickness direction, and the opening is open on the back surface of the base material layer, and around the opening, the base material layer and the second cover layer are joined together through a recess-protrusion relationship, thereby forming a sealing portion that seals the gap between the base material layer and the second cover layer.

DETAILED DESCRIPTION OF THE PREFERRED EMBODIMENTS

First Embodiment

Figure 1:
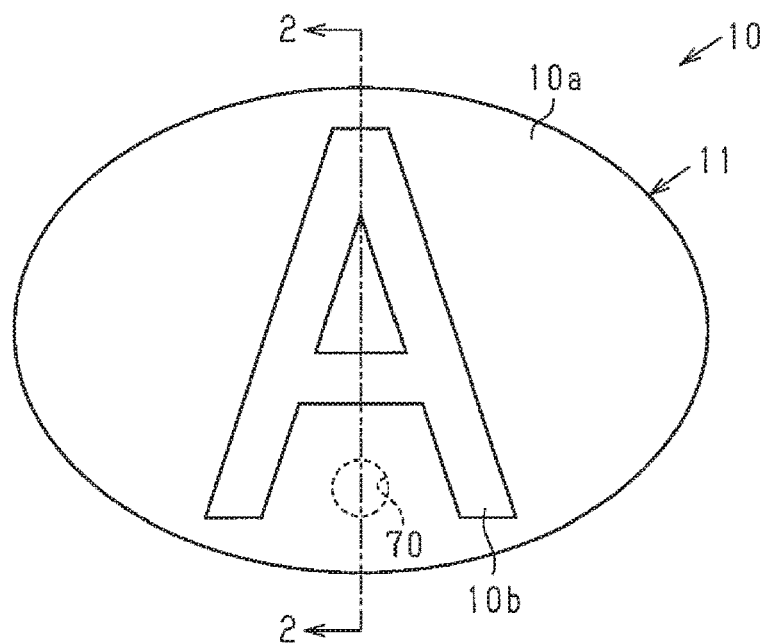
FIG. 1 is a front view illustrating a radio wave transmissive cover in general according to a first embodiment of the radio wave transmissive cover.

In the following, a first embodiment of the radio wave transmissive cover is described with reference to FIGS. 1 to 3. As shown in FIG. 1, the radio wave transmissive cover (hereafter referred to as the cover 10) has an elliptical shape extending in the lateral direction as seen from the front. The cover 10 includes a cover body 11 serving as an emblem and a plurality of mounting parts (not shown). The mounting parts extend from the back surface of the cover body 11 and are attached to openings provided on the front grille of a vehicle.

Figure 2:
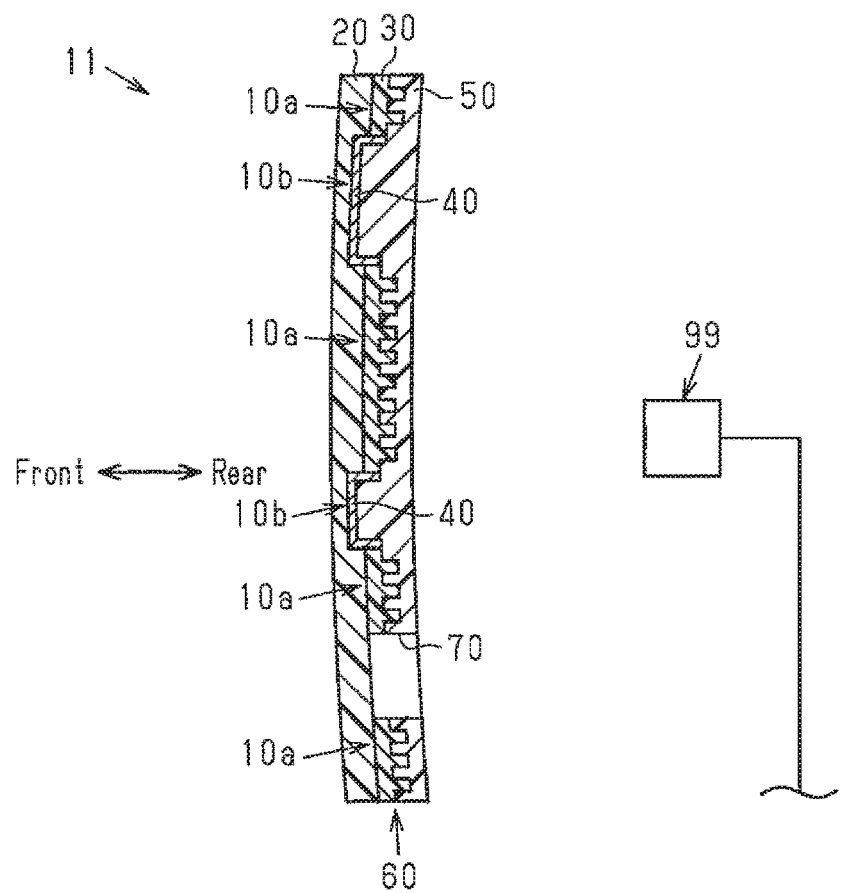
FIG. 2 is a cross-sectional view taken along line 2-2 in FIG. 1.

As shown in FIG. 2, a radio wave radar device 99 is arranged behind the cover body 11. The radio wave radar device 99 transmits radio waves (millimeter waves) forward and receives those radio waves reflected by a nearby vehicle or obstacle. In other words, the cover body 11 is arranged in a radio wave path of the radio wave radar device 99.

In the following, the front and the rear in the travelling direction of radio waves transmitted by the radio wave radar device 99 are described as the "front" and the "rear." In the present embodiment, since the radio wave radar device 99 transmits radio waves forward in front of the vehicle, the front and the rear in the travelling direction of radio waves correspond to the front and the rear in the longitudinal direction of the vehicle.

As shown in FIG. 1, a background field 10*a* and a character field 10*b* are visually observed on the front surface of the cover body 11. As shown in FIG. 1, in the present embodiment, the character field 10*b* has a shape representing the letter A of the English alphabet. As shown in FIGS. 2 and 3, the cover body 11 includes a first cover layer 20 constituting the front surface of the cover body 11.

Since the first cover layer 20 is supposed to be exposed to the outside when installed in the vehicle, the first cover layer 20 is made of polycarbonate (first plastic material) superior in weather resistance and abrasion resistance. A general part 20*a* corresponding to the background field 10*a* and a recess 20*b* corresponding to the character field 10*b* are arranged on the back surface of the first cover layer 20. The bottom of the recess 20*b* is located forward of the general part 20*a*.

A colored second cover layer 30 is integrally formed with a portion on the back surface of the first cover layer 20 that corresponds to the general part 20*a*. The second cover layer 30 is made of a material containing polycarbonate (first plastic material) and colorant.

A front surface 30*a* of the second cover layer 30 and the general part 20*a* of the first cover layer 20 are thermally welded together with the same type of plastic material. This seals the gap between the first cover layer 20 and the second cover layer 30, thereby preventing infiltration of water such as rainwater.

Figure 3:
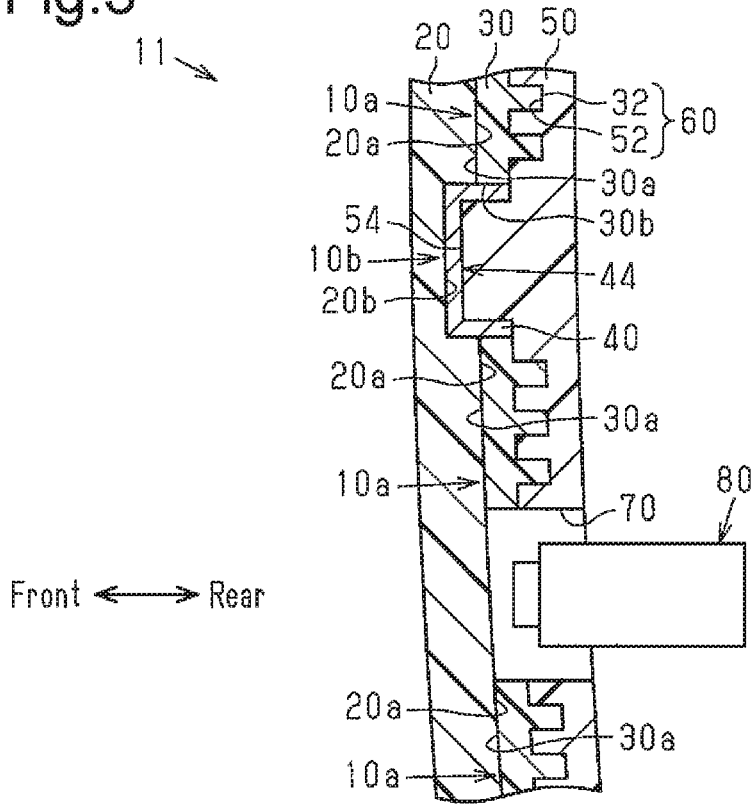
FIG. 3 is an enlarged cross-sectional view illustrating an open part and its surroundings in the radio wave transmissive cover according to the first embodiment.

As shown in FIG. 3, a through-hole 30*b* extending through the second cover layer 30 in the thickness direction is provided on a portion corresponding to the recess 20*b* of the first cover layer 20 in the second cover layer 30. Protrusions 32 protruding to the rear are formed at intervals in the vertical direction on the back surface of the second cover layer 30. The protrusions 32 are formed on the entire back surface of the second cover layer 30. Each protrusion 32 extends along with the longitudinal direction of the cover body 11. The longitudinal direction of the cover body 11 corresponds to the direction orthogonal to the drawing of FIG. 3 and to the horizontal direction in FIG. 1.

As shown in FIGS. 2 and 3, a decorative layer 40 having a substantially U-shaped cross section is deposited on the bottom and the inner surface of the recess 20*b* of the first cover layer 20 and on the inner surface of the through-hole 30*b* of the second cover layer 30, thereby being integrally formed. In other words, the decorative layer 40 is formed on the portions of the first cover layer 20 and the second cover layer 30 that correspond to the through-hole 30*b*. The decorative layer 40 is made of a metallic material such as indium. The decorative layer 40 is formed on the recess 20*b* corresponding to the character field 10*b*, so that the decorative layer 40 is visually observed on the front surface of the cover body 11 through the transparent first cover layer 20.

A base material layer 50 made of AES plastic and constituting the back surface of the cover body 11 is integrally formed with the back surfaces of the second cover layer 30 and the decorative layer 40. In other words, the base material layer 50 is made of a second plastic material (AES plastic) different from the first plastic material (polycarbonate), which is the material for the first cover layer 20 and the second cover layer 30. The above mounting parts (not shown) are integrally formed with the back surface of the base material layer 50.

As shown in FIG. 3, recesses 52 for receiving respective protrusions 32 of the second cover layer 30 are formed on the front surface of the base material layer 50. In other words, the base material layer 50 and the second cover layer 30 are joined together through a recess-protrusion relationship. The recesses 52 of the base material layer 50 and the protrusions 32 of the second cover layer 30 constitute a sealing portion 60 that seals the gap between the base material layer 50 and the second cover layer 30.

The base material layer 50 is formed by injecting AES plastic into molding dies (not shown) into which the first cover layer 20, the second cover layer 30, and the decorative layer 40, all of which are integrally formed, are inserted. In accordance with this, when the AES plastic is injected for molding, the distal end of each protrusion 32 of the second cover layer 30 is slightly tilted due to the injection pressure of the AES plastic. This exerts stronger anchoring effects on the recesses 52 of the base material layer 50 and the protrusions 32 of the second cover layer 30.

As shown in FIG. 3, the bottom (back surface) and the inner surface of the decorative layer 40 define a recess 44. The base material layer 50 includes a protrusion 54 housed in the recess 44. As shown in FIGS. 1 to 3, on the background field 10*a*, an opening 70 is provided between the outer circumference and the center of the cover body 11. The opening 70 extends through the base material layer 50 and the second cover layer 30 in the thickness direction and is open on the back surface of the base material layer 50. The opening 70 according to the present embodiment has a circular shape as seen from the front. Further, the opening 70 is located at the center in the width direction (horizontal direction in FIG. 1) of the cover body 11 and in a lower portion in the vertical direction.

As mentioned above, the sealing portion 60 is formed in the entire gap between the base material layer 50 and the second cover layer 30 except the portions corresponding to the through-hole 30*b* of the second cover layer 30. In accordance with this, the sealing portion 60 is formed around the opening 70.

In the following, an operation of the first embodiment will be described. The cover 10 according to the first embodiment has the opening 70 between the outer circumference and the center of the cover body 11, namely a portion that is unlikely to block radio waves of the radio wave radar device 99. Visible light is allowed to pass through the opening 70 and the transparent first cover layer 20. This enables a camera 80 for recording the front of the cover 10 to be arranged in the opening 70 as shown in FIG. 3.

At the sealing portion 60 formed around the opening 70, the base material layer 50 and the second cover layer 30 are joined together through a recess-protrusion relationship. This prevents infiltration of water through the gap between the base material layer 50 and the second cover layer 30.

The radio wave transmissive cover according to the first embodiment provides the following advantages.

(1) The opening 70 is provided between the outer circumference and the center of the cover body 11. The opening 70 extends through the base material layer 50 and the second cover layer 30 in the thickness direction and is open on the back surface of the base material layer 50. Around the opening 70, the base material layer 50 and the second cover layer 30 are joined together through a recess-protrusion relationship, thereby forming the sealing portion 60 that seals the gap between the base material layer 50 and the second cover layer 30.

With such a structure, the shape of the outer circumference of the cover body 11 is not affected by the opening 70, so that the structure improves the flexibility in the design of the cover 10. This improves the design feature of the cover 10 while maintaining sealing properties.

(2) The opening 70 extends through only the base material layer 50 and the second cover layer 30 in the thickness direction. With such a structure, the opening 70 is not provided on the first cover layer 20. Accordingly, when the camera 80 is arranged in or behind the opening 70, the camera 80 is less visually noticeable from the front of the cover 10 by virtue of the presence of the first cover layer 20.

Further, the opening 70 does not extend through the cover body 11 in the thickness direction, so that rainwater or the like from the front will not collect on the camera 80 through the opening 70. This prevents a decline in the functions of the camera 80 resulting from collected rainwater or the like.

(3) The second cover layer 30 includes, apart from the opening 70, the through-hole 30b extending through the second cover layer 30 in the thickness direction. The cover body 11 includes the decorative layer 40 formed on the portions of the first cover layer 20 and the base material layer 50 that correspond to the through-hole 30b.

With such a structure, the decorative layer 40 is visually observed on the front surface of the cover body 11 through the transparent first cover layer 20. Thus, the cover 10 including the decorative layer 40 is realized while employing the structure in which the base material layer 50 and the second cover layer 30 are joined together through a recess-protrusion relationship.

Second Embodiment

In the following, a second embodiment is described with reference to FIGS. 4 and 5. In the second embodiment, identical reference numerals are given to the components that are identical to the corresponding components of the first embodiment. Reference numerals 1**, which are obtained by adding 100 to the reference numerals of the components of the first embodiment, are given to the components that correspond to the components of the first embodiment and redundant description is omitted herein.

Figure 4:
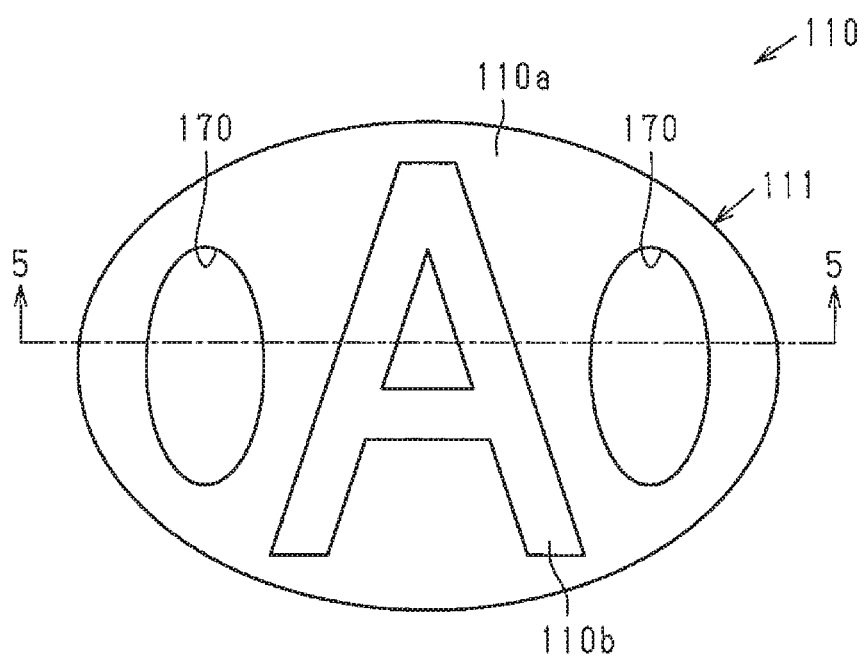
FIG. 4 is a front view illustrating a radio wave transmissive cover in general according to a second embodiment.
Figure 5:
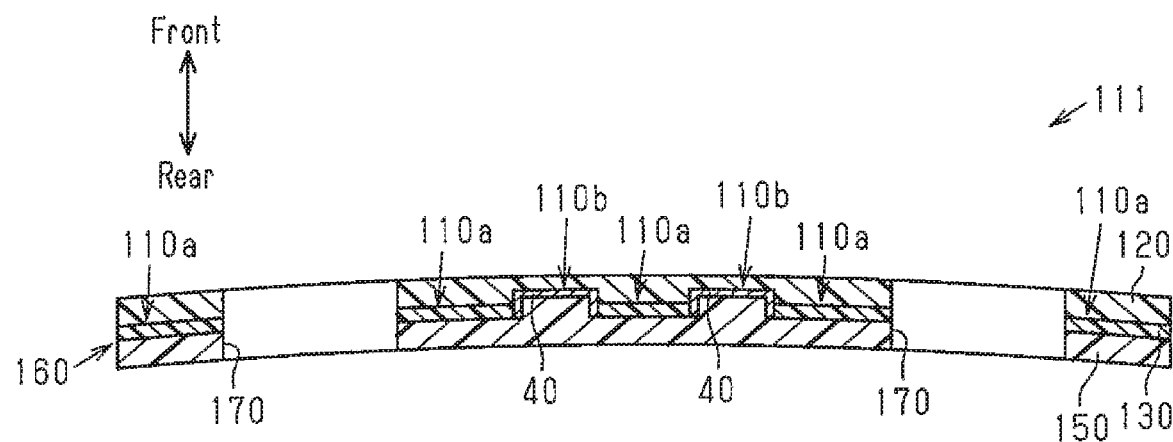
FIG. 5 is a cross-sectional view taken along line 5-5 in FIG. 4.

As shown in FIGS. 4 and 5, a background field 110a and a character field 110b are visually observed on the front surface of a cover body 111. A pair of openings 170 is provided on the opposite sides of the character field 110b in the longitudinal direction in the background field 110a. Each opening 170 extends through the cover body 111 in the thickness direction. The opening 170 according to the present embodiment has an elliptical shape longer in the vertical direction than in the lateral direction as seen from the front.

As shown in FIG. 5, a sealing portion 160 that seals the gap between a base material layer 150 and a second cover layer 130 is formed around the opening 170. The sealing portion 160 is formed over the entire circumference of the opening 170. The radio wave transmissive cover according to the second embodiment provides the following operational advantages.

(4) The opening 170 extends through the cover body 111 in the thickness direction. According to such a structure, the opening 170 extends through from the base material layer 150 to a first cover layer 120 in the thickness direction. This enables an engine installed in the front of the vehicle, for example, to take in airflow due to the relative wind to the engine compartment through the opening 170 to cool the engine or the like. Further, the radio wave transmissive cover may be reduced in weight in comparison with the structure where the opening does not extend through the first cover layer.

Modifications

The above-described embodiment may be modified as follows.

The cover 10 of the first embodiment may be modified to a cover 210 as will be described in the following. In the cover 210 shown in FIGS. 6 and 7, identical reference numerals are given to the components that are identical to the corresponding components of the first embodiment. Reference numerals 2**, which are obtained by adding 200 to the reference numerals of the components of the first embodiment, are given to the components that correspond to the components of the first embodiment and redundant description is omitted herein.

Figure 6:
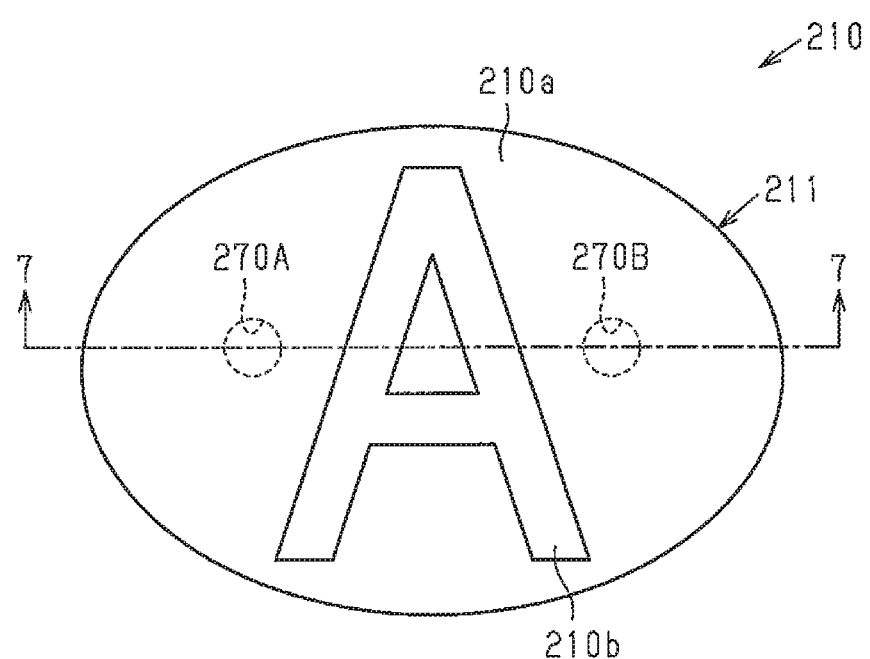
FIG. 6 is a front view illustrating a radio wave transmissive cover in general according to a modification of the radio wave transmissive cover.
Figure 7:
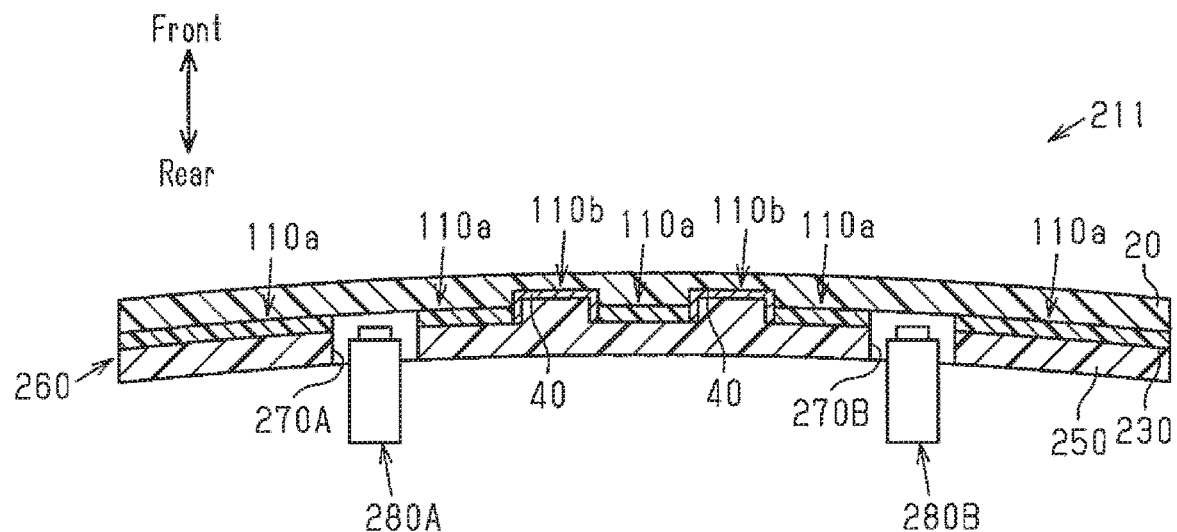
FIG. 7 is a cross-sectional view taken along line 7-7 in FIG. 6.

As shown in FIGS. 6 and 7, a background field 210a and a character field 210b are visually observed on the front surface of a cover body 211. A pair of openings 270A and 270B is symmetrically provided on the opposite sides of the character field 210b in the longitudinal direction in the background field 210a. The openings 270A and 270B have a circular shape of the same size as seen from the front. A sealing portion 260 that seals the gap between a base material layer 250 and a second cover layer 230 is formed around each of the openings 270A and 270B. The sealing portion 260 is formed over the entire circumference of each of the openings 270A and 270B. In this modification, as shown in FIG. 7, stereo cameras 280A and 280B for measuring the distance to a nearby (front) vehicle or obstacle may be arranged in the openings 270A and 270B, respectively.

Figure 8:
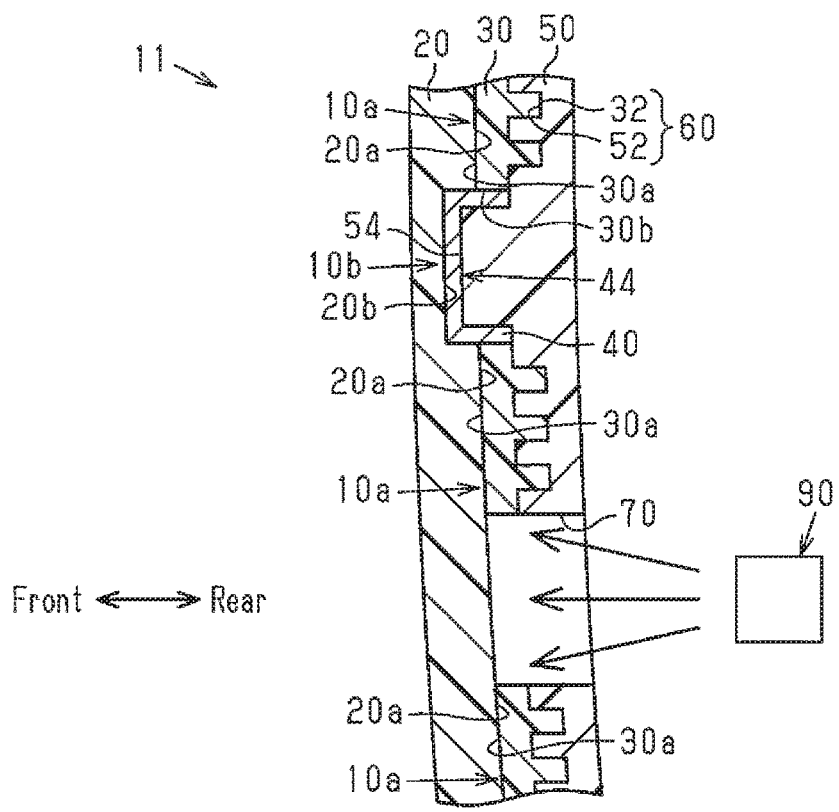
FIG. 8 is an enlarged cross-sectional view illustrating a radio wave transmissive cover through which light passes according to a modification of the radio wave transmissive cover.

The cover 10 of the first embodiment may also be used as follows. Specifically, as shown in FIG. 8, the camera 80 may be replaced by a lighting device 90 such as an LED behind the opening 70 provided on the cover 10. In this case, a field in front of the cover body 11 can be illuminated through the opening 70. Further, the opening 70 is not limited to have the circular shape as seen from the front but may be varied to have any type of shape. Since illumination is possible through the opening 70 in this manner, the structure improves the flexibility in the design of the cover 10.

The base material layer 50, the base material layer 150, and the base material layer 250 may be made of ABS plastic. The first cover layer 20 may be a transparent member made of a plastic material, so that the first cover layer 20 may also be made of acrylic plastic such as PMMA (polymethyl methacrylate) plastic.

For example, in the first embodiment, a portion on the back surface of the first cover layer 20 that corresponds to the opening 70 may be subjected to a smoking process. The radio wave transmissive cover according to the present invention is not limited to ones serving as an emblem attached to the openings of a front grille but may be ones not serving as an emblem. In other words, as long as the radio wave transmissive cover is configured to be arranged in a radio wave path of a radio wave radar device, the cover may be configured to be attached to the rear or the side of a vehicle.

The invention claimed is:

1. A radio wave transmissive cover configured to be arranged in a radio wave path of a radio wave radar device, the radio wave transmissive cover comprising a cover body, wherein the cover body includes:

a transparent first cover layer made of a first plastic material;

a colored second cover layer made of a material containing the first plastic material and colorant, the second cover layer being formed on a back surface of the first cover layer; and a base material layer made of a second plastic material different from the first plastic material, the base material layer being formed on a back surface of the second cover layer, wherein an opening is provided between an outer circumference and a center of the cover body, wherein the opening extends through at least the base material layer and the second cover layer in a thickness direction, and the opening is open on a back surface of the base material layer, and the base material layer and the second cover layer are joined together through a recess-protrusion relationship, thereby forming a sealing portion around the opening, the sealing portion sealing a gap between the base material layer and the second cover layer.

2. The radio wave transmissive cover according to claim 1, wherein the opening extends through only the base material layer and the second cover layer in the thickness direction.

3. The radio wave transmissive cover according to claim 1, wherein the opening extends through the cover body in the thickness direction.

4. The radio wave transmissive cover according to claim 1, wherein the second cover layer includes, apart from the opening, a through-hole extending through the second cover layer in the thickness direction, and the cover body includes a decorative layer formed on portions of the first cover layer and the base material layer that correspond to the through-hole.

* * * * *